Aug. 16, 1966 F. W. SCHAAF 3,267,454

LINE JUSTIFYING AND PROPORTIONAL SPACING APPARATUS FOR DISPLAY DEVICES

Filed June 24, 1963 6 Sheets-Sheet 1

INVENTOR

FRED W. SCHAAF

BY K. P. Johnson

ATTORNEY

Aug. 16, 1966 F. W. SCHAAF 3,267,454

LINE JUSTIFYING AND PROPORTIONAL SPACING APPARATUS FOR DISPLAY DEVICES

Filed June 24, 1963 6 Sheets-Sheet 3

Aug. 16, 1966 F. W. SCHAAF 3,267,454

LINE JUSTIFYING AND PROPORTIONAL SPACING APPARATUS FOR DISPLAY DEVICES

Filed June 24, 1963 6 Sheets-Sheet 6

United States Patent Office 3,267,454

Patented August 16, 1966

3,267,454

LINE JUSTIFYING AND PROPORTIONAL SPACING APPARATUS FOR DISPLAY DEVICES

Fred W. Schaaf, Owego, N.Y., assignor to International Business Machines Corporation, New York, N.Y., a corporation of New York Filed June 24, 1963, Ser. No. 290,069
12 Claims. (Cl. 340—324)

This invention relates generally to cathode ray tube display systems and more particularly to such a system for justifying displayed lines of information and proportionally spacing the characters in the information lines.

Generally, pluralities of alphabetic, numeric or special characters are displayed on the face of a cathode ray tube as lines of information without regard to the character width, and no attempt is made to justify the displayed line. Each character is allocated an arbitrary fixed increment of line length and centered therein so that an "I" or "l" require the same portion of a line as a "W." Characters composing an information line are sequentially generated until a suitable termination point is encountered such as a word space or sentence end before reaching the physical limit of the line. When the displayed information is to be visually monitored, the invariable character spacing and variable line length are of little concern.

However, if the cathode ray tube display system is to be used in certain applications such as photocomposing, proportional character spacing and line justification become necessary. In photocomposing, proportional spacing is usually accomplished by displaying characters singly on the tube face and advancing a photosensitive record in accordance with a preassignel character width before exposure so that the successively displayed characters are proportionally spaced on the record. This procedure requires that a relatively heavy mass be accelerated and positioned for each character to be exposed.

Line justification is accomplished by first composing an information line without any tube display and then either manually or automatically making suitable insertions of line spacing control signals to expand the line at selected locations to its desired length during a subsequent character display. The sensitized record must be moved appropriately to also incorporate the added spaces for justification. This method requires that the line be stored and often illustrated, usually on a typewritten copy, so that selective expansion can be properly made within the line.

With both proportional spacing and justification in the usual manner it will be noted that the time necessary to display a line is limited by a mechanical movement of the carrier for the sensitized paper and by the time required to select the proper locations within the line for expansion. The time required for proportionally spacing characters and justifying is not a serious drawback when the characters are selected manually from a keyboard. This time does, however, become significant when the characters can be read out of a computer memory at electronic speed. In this instance, display and exposure time are relatively small compared to the total time required to compose a line so that a significant improvement is possible in photocomposing devices if proportional spacing and line justification can be done at electronic speed.

Accordingly, a primary object of this invention is to provide apparatus for proportionally spacing and justifying a plurality of characters displayed as a line of information on the face of a cathode ray tube.

Another object of this invention is to provide proportional character spacing and line justifying apparatus which is compatible for use with electronic data processing machines.

Another object of this invention is to provide apparatus in a cathode ray tube display system for selecting electron beam locations in accordance with the width of each of a plurality of characters represented by coded input data.

Yet another object of this invention is to provide apparatus in a cathode ray tube display system for advancing the electron beam across the tube face by increments which vary according to the amount of line justification required in a line of characters to be displayed.

Another object of this invention is to provide cathode ray tube display apparatus capable of justifying a character line by uniform expansion throughout without the necessity of selecting particular line locations to be expanded.

In accordance with the foregoing objects, this invention provides register means for receiving coded input information representative of characters that are to appear in an information line to be displayed. Decoding means indicate the increments of line length required by each character by providing an output pulse for each increment and supplying them to a counting means. The counting means, which has a limited count capacity representing the maximum increments possible in a line, is advanced by the pulses until the total number of increments in the subject line has been indicated. The difference between the capacity and total counts is then applied as a correction signal to electrical control means for the cathode ray tube deflection elements to alter the effect thereof in proportion to the line length correction required for justification. In order to obtain the correction factor, each character in the line is received and decoded but the cathode ray tube beam is blanked to prevent display.

After the correction signal has been obtained and the counting means reset, the characters in the line are again presented sequentially and the tube beam unblanked. On this pass, character generating means in the tube system select the proper character from a character matrix in response to the input data. Each character is positioned in the matrix according to its width in line length increments and, with the beam unblanked, is positioned on the tube face as controlled by the tube deflection elements. Simultaneously with the generation of each character, the decoding means again produces output pulses to advance the counting means a number of line length increments necessary for each character. The counting means in turn varies the electrical control means as corrected for the deflection elements and positions the beam incrementally across the tube face in accordance with the character width required. The location of the generated character is thus positioned in the information line according to its width, and the total character increments in the line are expanded to form a justified line.

The invention has the advantage of being operable at high display speed compatible with computer memories without the necessity of displaying the information line prior to justification or selecting particular line locations which are to be expanded. Each increment of line length is expanded the same amount so that the required length increase is distributed throughout the line to improve the over-all line appearance. This is accomplished without altering the normal character size. When the display is to be photographically recorded, the mechanical positioning of the sensitized record for each character is obviated with the result that the record is advanced only once per line or only after a plurality of lines have been displayed if several lines are displayed together on the tube face.

The foregoing and other objects, features and advantages of the invention will be apparent from the following more particular description of a preferred embodiment of the invention, as illustrated in the accompanying drawings in which.

Figure 1:
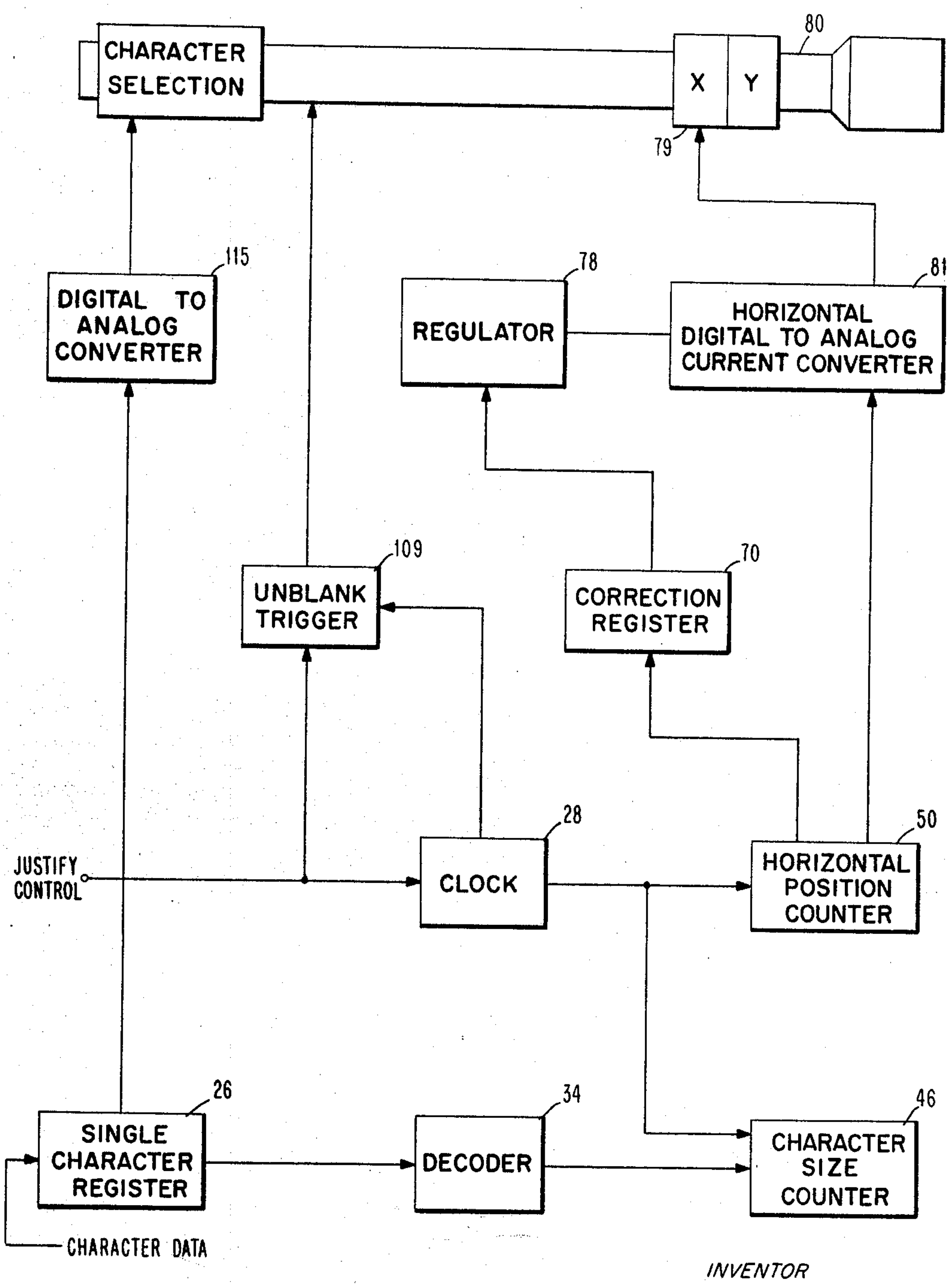
FIGURE 1 is a general block diagram of the cathode ray tube display apparatus embodying the invention.
Figure 7:
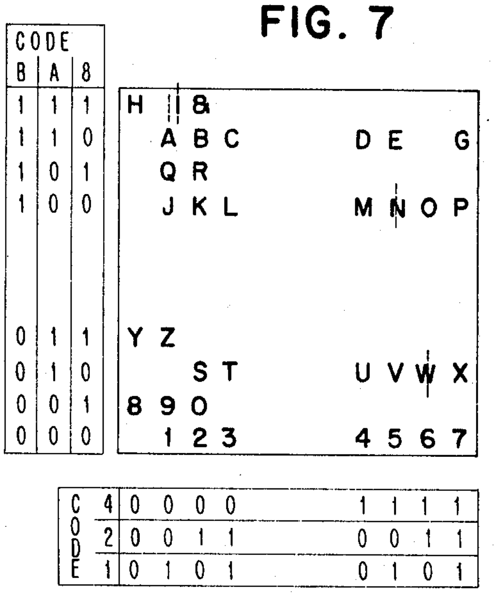
Figure 5:
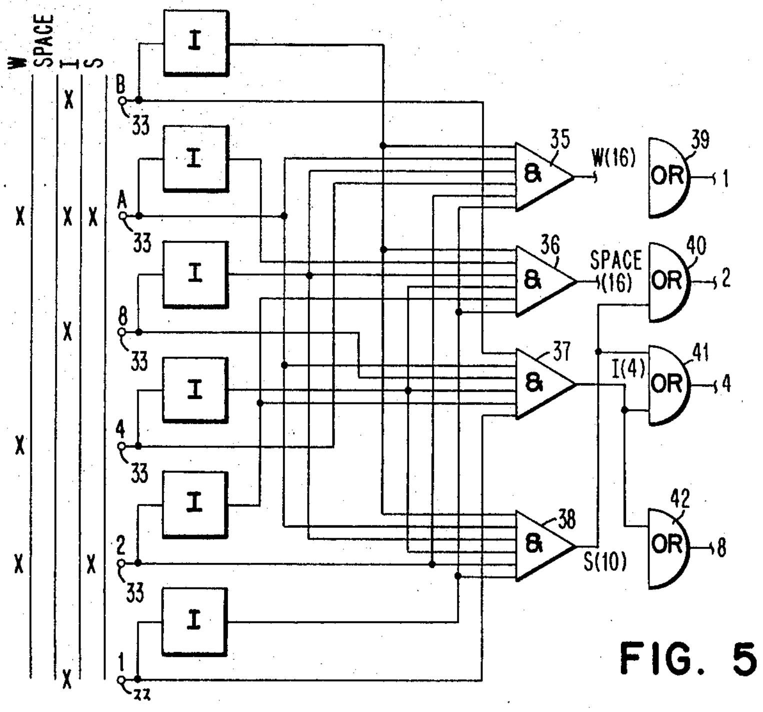
Figure 3A:
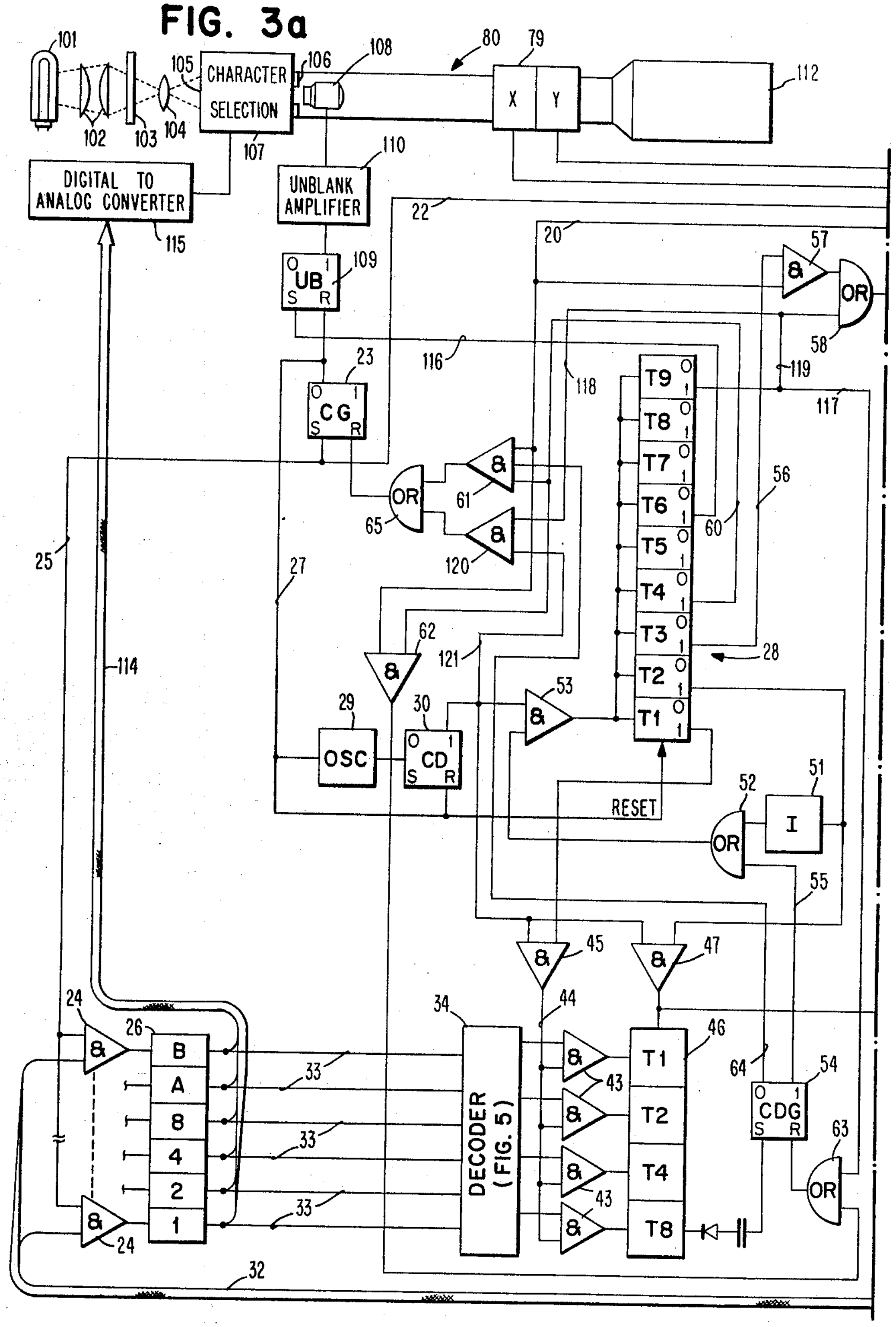
Figure 3B:
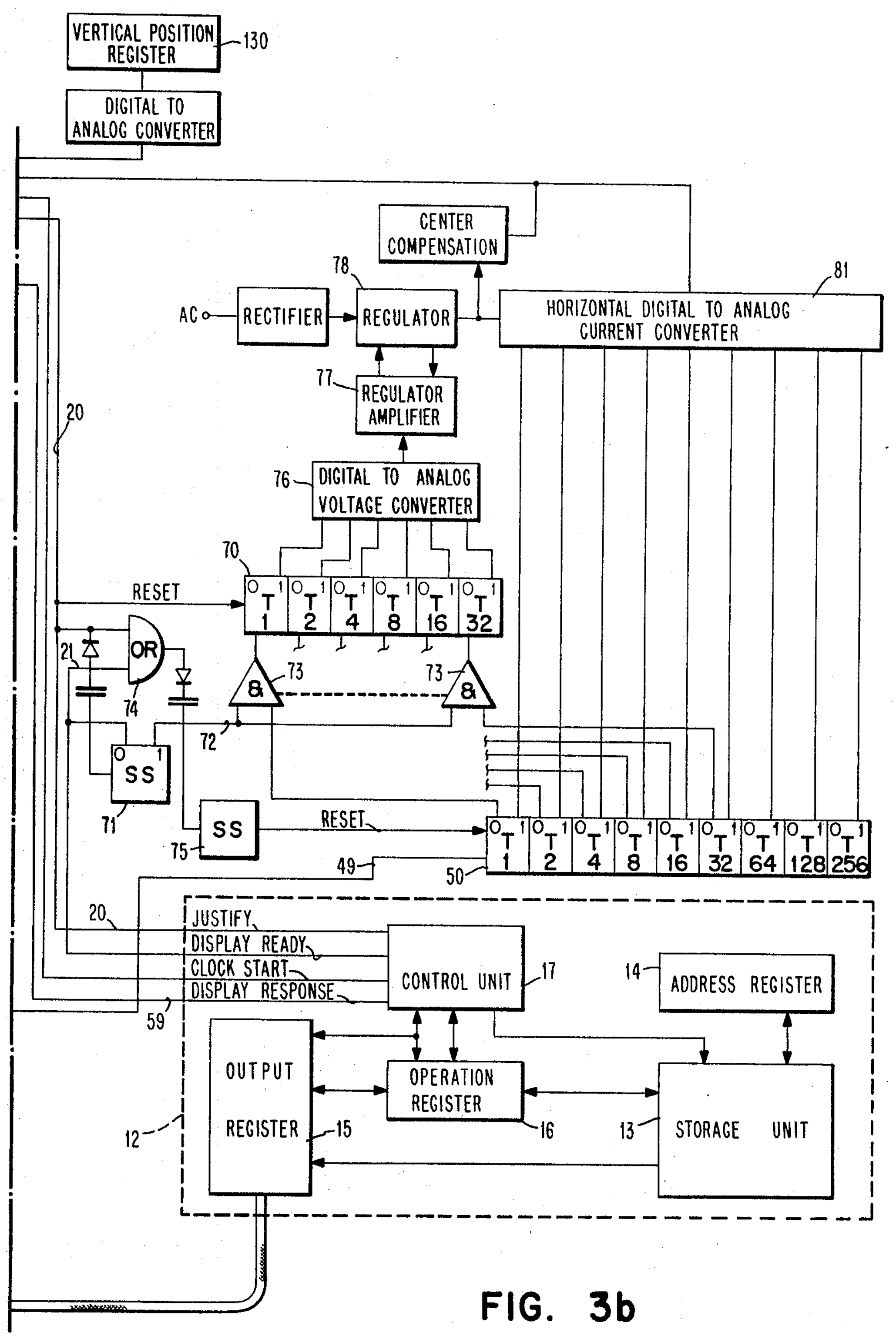
Figure 4:
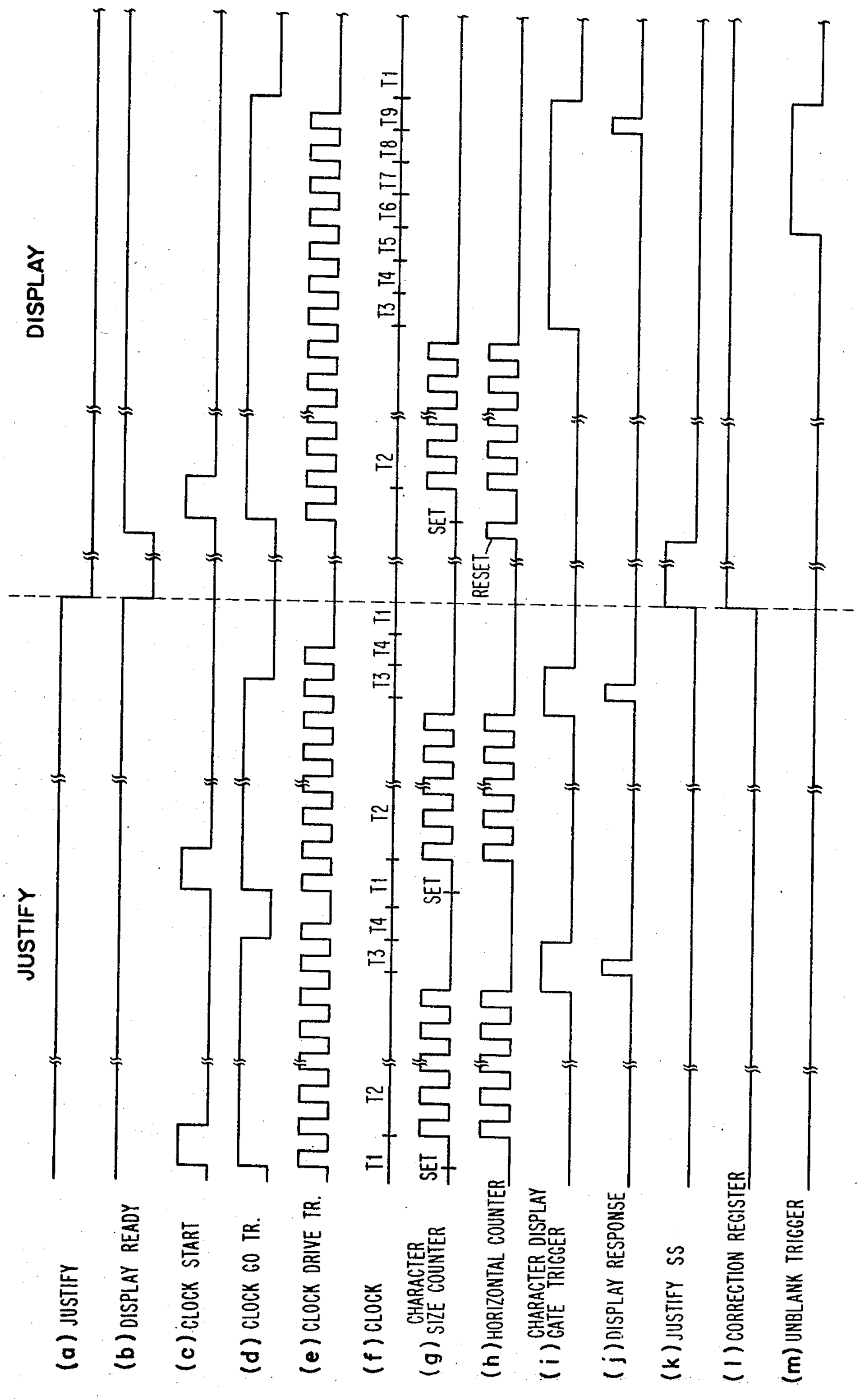
Figure 6:
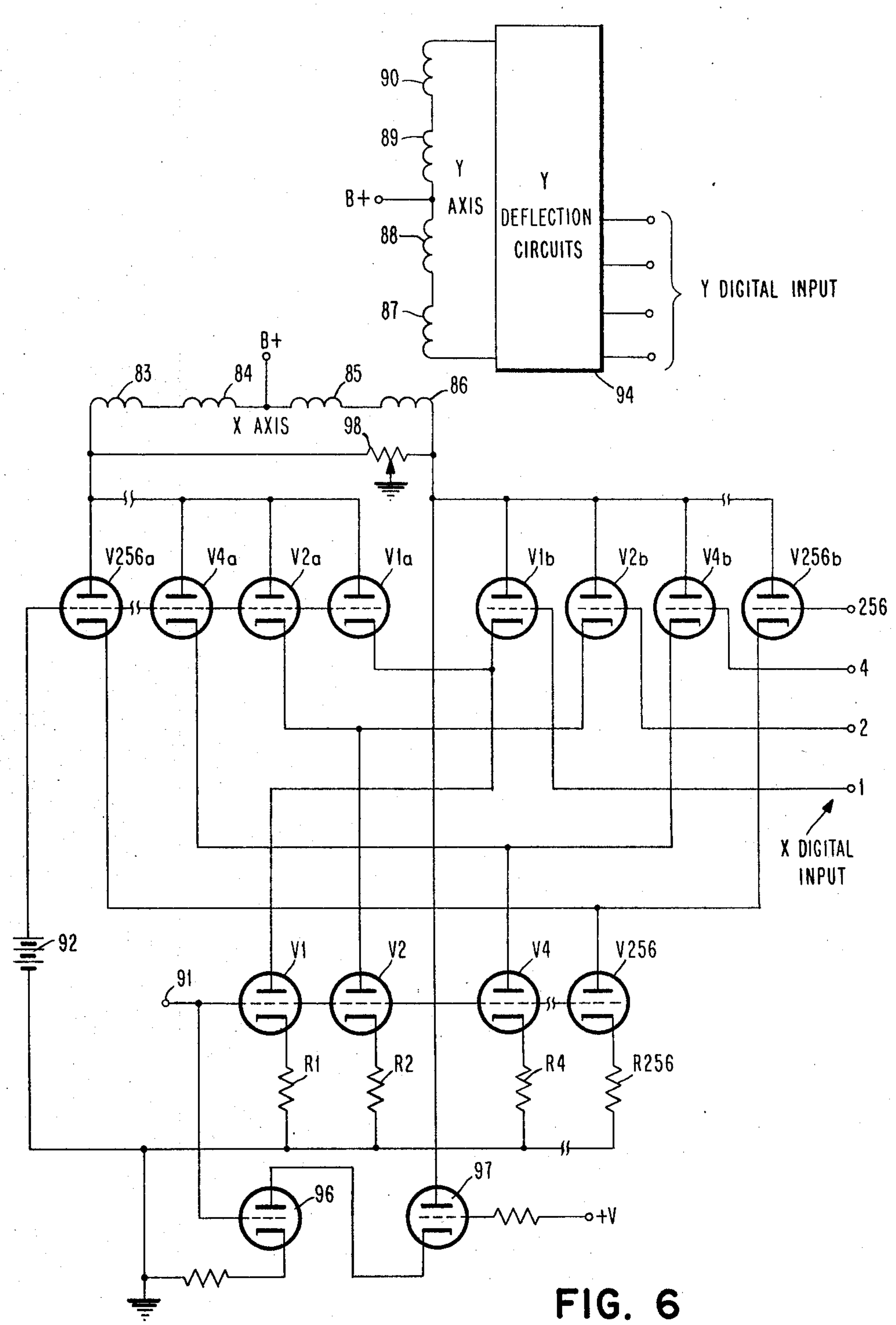

FIGURES 3*a* and 3*b* are detailed schematic diagrams of the circuits of the general block diagram shown in FIG. 1;

FIGURE 4 is a timing diagram for the circuits shown in FIGS. 3*a* and 3*b*;

FIGURE 5 is a detailed diagram of a character space decoding circuit as used in the invention;

FIGURE 6 is a schematic diagram of a digital to analog current converter that may be used in the invention; and FIGURE 7 illustrates a character matrix as used in conjunction with the cathode ray tube.

Referring to FIG. 1, there is shown a general schematic diagram of the justification and proportional spacing apparatus of the invention. In order to determine the amount of line justification, the information appearing in a line must be presented twice. Justification is controlled by a signal to prevent display by cathode ray tube 80 through Unblank trigger 109 and a signal to start Clock 28, thereby initiating a justification pass of display information. Data for each successive character is presented at Single Character Register 26 and subsequently to Decoder 34 where the incremental width of the character is determined. The difference between the increments of character width and a predetermined maximum is entered as a complement amount in Character Size Counter 46. Pulses from Clock 28 then advance Character Size Counter 46 and Horizontal Position Counter 50 until a carry pulse is generated by a counter 46 to stop the advance of counter 50. The input data for each character are examined in this manner until the widths of all characters appearing in the information have been accumulated in counter 50.

The Horizontal Position Counter 50 has a maximum count capacity equal to the maximum increments in an information line. After the line increments required by the characters have been summed therein, the difference between the sum and counter capacity is then transferred to Correction Register 70 from which it is applied to vary the voltage from Regulator 78. The change in Regulator voltage increases the current in the various switch stages of Horizontal Digital to Analog Current Converter 81 that supply increments of current to the X deflection coils 79. The increase in incremental current increases the increments of beam deflection when tube 80 is unblanked.

After the widths of all characters have been determined, the characters are again presented sequentially and Unblank trigger 109 is placed under the control of Clock 28. On the second or display pass each character to be displayed is selected through Digital to Analog Converter 115 and the character information is also presented again to Decoder 34 and Character Size Counter 46 in the manner already described. Counter 50, however, was reset at the start of the display pass so that it accumulates the character widths again. As each character width is added in counter 50, Converter 81 is controlled to supply current to deflection winding 79 and position the beam the required distance from the left margin or preceding character. After the deflection circuits have settled, Clock 28 operates Unblank Trigger 109 to display the selected character on the tube face. The following characters are sequentially decoded and displayed in the foregoing manner until the line has been completed.

Figure 2:
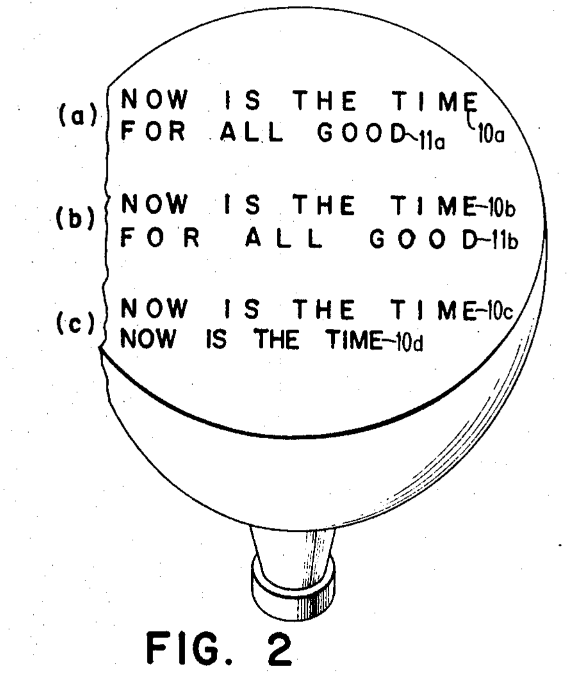
FIGURE 2 is an illustration of information displayed on the face of a cathode ray tube with and without the use of the invention.

In FIG. 2, there are examples of information lines as displayed on the face of a cathode ray tube with and without line justification and proportional spacing. FIG. 2*a* illustrates the usual method of character display in which lines **10*a* and 11*a*** are not justified and no proportional spacing is employed. The lines terminate at a convenient point and the characters are allocated identical increments of line length. Line justification, as performed by the invention, is shown in FIG. 2*b* by lines **10*b* and 11*b*. Each line extends the same length from margin to margin although line 11*b* has three fewer characters than 10*b*. Each character space of line 11*b*** is increased an amount proportional to the total line length increase required so that character and word spacing are not increased arbitrarily or unequally. Proportional spacing between characters, as accomplished by the invention, is illustrated in FIG. 2*c* by lines **10*c* and 10*d*. Each character in the latter line is allocated an increment of line length in proportion to its actual width, whereas each character in the former line is centered within spaces of common width regardless of the individual character width. It will be noted line 10*d* is shorter than line 10*c*** because of the proportional spacing employed. In proportional spacing each character is centered in its preassigned space but the space allotted is varied according to the particular character displayed. It is to be understood in this description that a word space is also considered as a character having a preassigned width.

When a cathode ray tube is to be used for displaying information lines, the characters composing a line are usually entered as coded data in a temporary storage device either from a keyboard or other data source such as a computer memory. The purpose of the temporary storage is to assemble an edited line of information prior to display to establish the particular characters that are to be displayed in one line. Such storage is necessary in order to determine the amount of justification required for each line display, or that a full line is not present so that justification is not to be used. Justification is limited to expanding a line up to a known maximum of character spaces which are sufficient to correct for monosyllabic words or syllables extending beyond the maximum line length. Word spaces are added in lines which are too short for justification. Line editing may be accomplished by machine or a keyboard operator. The invention requires only that the characters of an information line be edited and stored in any suitable register ready for transmission to the display apparatus.

The description of the cathode ray tube display apparatus will continue now with reference to FIGS. 3*a*, 3*b* and 4 which are circuit and signal timing diagrams of the display system in conjunction with a general purpose digital computer as a source of display information. The computer is indicated generally as 12 and includes a Storage Unit 13 and Address Register 14 to select the characters transmitted to the Output Register 15, where the selected characters are stored for transmission to the display device. The readout of Register 15 is controlled by an Operation Register 16 and Control Unit 17 with the latter unit also serving as a control link with the display apparatus during the transmission of characters.

The display apparatus has a fixed line length which can be displayed and a line of this length is assembled in Storage Unit 13 with proper punctuation upon a signal to the Control Unit 17 by Operation Register 16. When an information line has been stored, a signal is generated by Operation Register 16 to Control Unit 17 that the characters are ready for transmission to the display apparatus. As a result, the Justify trigger (not shown) in the control unit is turned on to indicate via line 20 that a line of characters is ready for justification (see FIG. 4*a*). If the display apparatus is also ready, as will be assumed at this point, a Display Ready signal (FIG. 4*b*) on line 21 to Control Unit 17 permits initiation of a Clock Start signal on line 22 (FIG. 4*c*) to the display apparatus.

When a Justify signal occurs on line 20 it remains until all coded characters in the line have been presented for justification through Output Register 15. The signal is used to condition three coincidence or AND circuits and as a reset pulse prior to justification. The operation will be described hereinafter. For the present, it may be assumed that all necessary circuits have been reset.

The occurrence of a Clock Start signal on line 22 sets Clock Go trigger 23 on (FIG. 4*d*) and conditions AND circuits 24 via line 25 for the receipt of coded input data at Single Character Register 26. By way of explanation, it will be understood in this description of the system that the presence or absence of a signal means merely the upper or lower, respectively, of two voltage levels. Furthermore, whenever a trigger is turned on or set, the binary 1 output line will rise and the binary 0 output line will fall, and these outputs will reverse when the trigger is turned off or reset. When Clock Go trigger 23 is set, the signal is removed from line 27 which removes the reset condition from Clock Trigger Ring 28 leaving the first stage T1 of its nine stages on, starts Clock Oscillator 29, and removes the reset condition from Clock Drive trigger 30 (FIG. 4*e*). Oscillator 29 operates at 250 kilocycles per second so that the Clock Drive trigger operates 125 kilocycles per second. The output pulses from the binary 1 side of the Clock Drive trigger are used to condition several AND circuits as will be described subsequently.

When AND circuits 24 are conditioned by the Clock Start signal, the binary coded input data signals representing a character on the six input channels of Character Bus 32 cause corresponding triggers or latches of the Character Register 26 to be set. Each character is represented by an unique combination of channel signals or bits in the six bit binary code expressed in the 1 2 4 8 A B notation. The setting of triggers in the Character Register 26 serves as temporary storage of the character transmitted thereto. The stored information is used for two purposes: one purpose is for the selection of a character from a matrix for display and the second is to determine the incremental width of the character.

When the triggers of Register 26 have been set, particular ones of lines 33 have signals appearing thereon which serve as inputs to Character Space Decoder 34. The decoding circuit determines the appropriate increments of line length required by each character to be displayed and is shown in greater detail in FIG. 5. In the figure there is shown at the left side an example of the six bit code for the characters "W," "Space," "I" and "S." As each combination of signals representing a character is presented to the decoder, the number of increments of line length required by each character is indicated. Each character of the display font is assigned a width in increments of line length including space required at either side of the character. For example, a word space and a "W" are considered the widest characters in this embodiment and each has been assigned a width of sixteen line length increments. The "I" and "S" are respectively assigned widths of four and ten increments. Thus, when the code for a "W" appears on line 33, only the 2 4 and A bit lines have a signal thereon and these signals appear as direct conditioning inputs to AND circuit 35. Because other characters may utilize the same bit signals, but in different combinations, AND circuit 35 also requires the inverted or not conditions of bit lines 1 8 and B. With this particular combination of signals present, AND circuit 35 is enabled and an output appears therefrom. Similarly, "Space" AND circuit 36 produces a signal when no bits are present on the six bit lines 33. The "I" and "S" AND circuits 37 and 38 each produce an output when the respective bit combinations of 1 8 A B and 2 A are present on lines 33. This width decoding system can obviously be extended to include other characters with the addition of appropriate AND circuits. It is to be noted that each increment of line length is identical in size and the number of line increments assigned each character depends upon the display font used and spacing desired between characters.

In order to define the amount of justification required in a given information line, the difference between the capacity of the line and the actual increments occupied by the characters must be determined. The maximum length is predetermined by the capacity of the Horizontal Position Counter, character size and cathode ray tube size. Actual line length is found by summing the line increments of the characters as they are presented on a justifying pass. This summation is accomplished by entering the incremental width of each character in a counter.

As each of the character AND circuits such as circuits 35–38 produce a signal, the signal is transmitted through appropriate OR circuits 39, 40, 41 or 42, each having their respective digit value of 1 2 4 or 8 in the binary coded decimal system. The outputs from AND circuits 35–38 are connected to the OR circuits to produce the complement value of the actual character width. Thus, an "S" has an actual width of 10 units and its circuit 38 is connected to OR circuits 40, 41 to indicate a complement of six units on the basis of sixteen units for the widest character. Similarly, an "I" AND circuit is connected to OR circuits 41 and 42 to indicate twelve units as its complement. The outputs, however, of the "W" and "Space" are not connected to an OR circuit as their complements are zero.

Returning now to FIGS. 3*a*, 3*b* and 4, the outputs from the OR circuits 39–42 serve as inputs to respective ones of AND circuits 43, in conjunction with an input on line 44 from AND circuit 45. The latter AND circuit is enabled to produce an output signal when stage T1 of Clock 28 and Clock Drive trigger 30 are turned on immediately after the Clock Start signal appears on line 22. This gating action permits AND circuits 43 to set their respective trigger stages of the four stage binary Character Size Counter 46. Clock 28 has turned off stage T1 by this time and turned on stage T2 whose output conditions AND circuit 47 for the passage of pulses from Clock Drive trigger 30 to advance Counter 46. Each pulse sent to Counter 46 also appears on line 49 to advance binary Horizontal Position Counter 50 which sums the character width increments for an entire display line (see waveforms *f*, *g* and *h* of FIG. 4). It will be noted that when stage T2 is turned on, its output signal is also applied to INVERTER 51 to produce a negative or down voltage level at OR circuit 52. This blocks AND circuit 53 so that Clock Drive pulses are not supplied to advance Clock 28. The Clock Drive pulses, however, are supplied without interruption to advance Counter 46 from the complement increment value until the counter produces a carry pulse when stage 8 is turned off on the registered count of sixteen. Counter 46 is thus supplied with a number of pulses equal to the number of increments of width of the selected character and these pulses are also supplied to the Horizontal Position Counter 50.

As the counter carry signal from Counter 46 falls, Character Display Gate trigger 54 is turned on (FIG. 4*i*) so that a signal appears on line 55 at OR circuit 52. This signal resets Register 26 and permits the next Clock Drive pulse to advance Clock 28 to stage T3, blocking additional pulses to Counters 46 and 50. At this point, Counter 46 has no count registered therein, but Counter 50 registers a count equal to the increments of width required for the selected character. The two counters are now available to determine and accumulate the width of the next character from the computer storage. A response from the display apparatus is indicated by a signal from Clock stage T3 on line 56 which is coincident with the Justify signal on line 20 at AND circuit 57 to provide an output signal from OR circuit 58 (FIGS. 4*f* and 4*j*) on line 59 to Computer Control Unit 17.

After a Display Response signal is provided on line 59, Clock 28 is advanced to stage T4 so that line 60 provides a signal to three-input AND circuit 61. Another input is the Justify signal which is present. The last input is provided by the T4 signal and Justify signal at AND circuit 62 which together produce a reset pulse for Character Display Gate trigger 54 via OR circuit 63. Upon resetting, the trigger provides an output on line 64 to AND circuit 61 to enable the latter to produce an output signal through OR circuit 65 and reset Clock Go trigger 23. When trigger 23 resets, Clock 28 is reset by the signal on line 27 which also blocks Oscillator 29 and resets Clock Drive trigger 30 to the off condition preparatory to receiving the next character. It will be noted that the clock cycles only to stage T4 during justification.

When the computer receives the Display Response signal on line 59 at Control Unit 17, a Clock Start signal on line 22 is generated and the next character is transferred on Character Bus 32 to repeat the above-described cycle of events. As each new character is decoded, its width in line length increments is accumulated in the Horizontal Position Counter 50 until the last character in the information line has been decoded. The computer signals the end of an information line by turning off its Justify trigger and removing the signal on line 20. The entire character data is now transmitted again to be displayed on the face of the cathode ray tube. However, a justification correction signal for the horizontal deflection coils is produced before display is started.

A justification correction signal is produced by developing an analog signal from the difference between the total increment count registered in Counter 50 and the count capacity thereof. Counter 50 is designed with a capacity equal to the maximum number of line length increments permissible in any line. During the justifying pass, sufficient characters should be presented to bring the actual count within a reasonable value that can be justified without destroying the appearance of the display. For example, if a line has a maximum length of 512 increments, or 32 sixteen-increment characters as indicated by the counter shown in FIG. 3*b*, it may be desirable to limit the line expansion to a 25% increase in the width of each unit actually required for a given line. The maximum expansion of a line is a matter of choice and the invention can be modified for operation with other expansion limits. In the circuit shown, the maximum expansion is up to 63 units which is determined by the number of binary trigger stages in Correction Register 70.

A correction or line expansion signal has a magnitude proportional to the difference between the count capacity and actual count standing in Horizontal Position Counter 50 at the end of a justifying pass. The correction is produced by determining the complement of the digital count registered in Counter 50 and generating an analog signal as a function thereof which is applied to the horizontal deflection circuit as will be described presently. When the Justify signal on line 20 falls an End Justify single shot 71 is turned on (FIGS. 4*a* and 4*k*) and provides an output signal of preset duration from the binary 1 terminal on line 72 to condition AND circuits 73. An AND circuit 73 is provided for each binary stage of Register 70. When gated by single shot 71, the AND circuits permit these binary trigger stages 1, 2, 4, 8, 16 and 32 of Counter 50 which are off to set corresponding trigger stages of Correction Register 70 (FIG. 41). Thus when Counter 50 has an actual increment count of 448 or greater, the difference between the actual and capacity counts of Counter 50 will be transferred to Register 70 at the end of the justifying pass. The size of the complement count can, of course, be varied by increasing or decreasing the number of stages in the Correction Register. When single shot 71 turns off, it produces a signal from its binary 0 terminal which is applied to OR circuit 74 to turn on single shot 75. The resulting output signal from the latter single shot resets all stages of Counter 50 to the 0 state in preparation for the display pass of the information line.

The correction signal is produced by applying the outputs of the ON triggers in the Correction Register to a suitable Digital to Analog Voltage Converter 76 to provide an output voltage signal therefrom which is a function of the magnitude of the binary count standing in Register 70. This signal is fed to a suitable Regulator Amplifier 77 which supplies an amplified voltage signal to a voltage Regulator 78 which controls the current supplied to the horizontal or X deflection winding 79 on cathode ray display tube 80 by the Horizontal Digital to Analog Current Converter 81. Converter 76, Regulator Amplifier 77 and Regulator 78 are well-known in the cathode ray tube art and need not be described in detail here.

Regulator 78 normally supplies a predetermined voltage to Converter 81 which, in turn, produces a known current and deflection by winding 79. However, when the amplified justification correction signal is applied to Regulator 78, the predetermined voltage to Converter 81 is altered to increase the current in the deflection coil 79 and increase the horizontal deflection of the cathode ray beam by an amount necessary to expand the ends of the justified lines to both the left and right hand margins. An example of a suitable circuit for Horizontal Digital to Analog Current Converter 81 is that disclosed in U.S. Patent No. 2,810,860 issued on October 22, 1957, to R. G. Mork. A brief description of that circuit, however, will be given here in conjunction with FIG. 6. In the figure, there are shown X and Y deflection windings which are each arranged in push-pull fashion. The horizontal deflection of the beam is controlled by the current through coils 83, 84, 85 and 86; the vertical deflection is similarly controlled by the current through coils 87, 88, 89 and 90.

The circuit comprises a plurality of triode tubes each corresponding to one of the stages of the Horizontal Position Counter 50 of FIG. 3*b*. In FIG. 6, however, only triodes V1, V2, V4 and V256 are shown in order to simplify the drawing. Each of these triodes acts as a constant current source and the value of constant current provided by each is determined by the output voltage at terminal 91 from Regulator 78 of FIG. 3*b* in conjunction with the cathode resistor associated with each tube. The current in each of the constant current sources is adjusted by varying the value of the cathode resistor in each source and for purposes of illustration the references R1, R2, R4 and R256 have been used to indicate a binary weighting. For example, current source V1 would supply 1 milliampere, V2 would supply 2 milliamperes, V4 would supply 4 milliamperes and V256 would supply 256 milliamperes. A choice of current used in a particular system would, of course, depend upon the sensitivity of the deflection winding or yoke.

Connected between the plates of the constant current tubes and coils of the X deflection yoke are two groups of switching tubes. The switching tubes operate in complement into the push-pull windings of the yoke, the left-hand group of switching tubes **V1*a*, V2*a*, V4*a* and V256*a* operating X deflection coils 83 and 84 and the right-hand group of switching tubes V1*b*, V2*b*, V4*b* and V256*b* operating the X deflection coils 85 and 86. It is to be noted that pairs of switch tubes operate through a common constant current tube. For example, switch tubes V1*a* and V1*b* operate through the constant current tube V1. The switch tubes V2*a* and V2*b* operate through the common constant current tube V2 and so on. The digital inputs to the X deflection circuits are binary coded signals from the corresponding stages of Counter 50 which feed into the grids of the right-hand switch tubes V1*b*–V256*b*. A fixed voltage source indicated as 92 is provided common to the grids of the left-hand switch tubes V1*a*–V256*a*** to determine the switching level.

In operation, the digital inputs are voltage levels wherein, for example, a binary 0 is represented by a voltage sufficiently less than that at 92 to cause the right-hand switch tubes to cut off. To illustrate a set of voltage conditions which may be applied to operate the circuits, assume that the B+ plate voltage is approximately 300 volts, the voltages at 91 and at 92 respectively set at 50 and 100 volts, and the cut off bias voltage of the switching tubes at 10 volts negative or, in other words, positive 90 volts. For selected values of tube characteristics and resistances, the left-hand switching tubes **V1*a*–V256*a* will be conducting current from the constant current sources due to the positive 100 volts potential on the grids and the IR drop across the constant current tube V1 and resistance R1, for example, places the cathodes of a pair of switching tubes V1*a* and V1*b* approximately 103 volts. For example, when a binary 0 voltage level is set at 90 volts, a binary 0 pulse fed into the grid of switch tube V1*b* places the grid thirteen volts negative with respect to its cathode potential or below cut off and tube V1*b* does not conduct. Hence, for a binary 0 on each digital input all current from the constant current sources passes through switch tubes V1*a*–V256*a* into the push-pull windings 83 and 84**.

In similar fashion, the binary 1 is represented by the voltage level on the digital inputs sufficiently greater than that at 92 to cause the left-hand group of the tubes **V1*a*–V256*a* to switch to cut off causing all the current from the constant current sources to pass through the right-hand switch tubes V1*b*–V256*b* into the push-pull windings 85 and 86. For example, with a binary 1 voltage level set at 110 volts, a binary 1 fed into the grid of V1*b* causes tube V1*b* to now conduct. The potential of cathodes at V1*a* and V1*b* will now increase to approximately 113 volts and consequently tube V1*a*** with its grid at 100 volts will be biased below cut off.

Since the action of each switch tube pair is independent of all other switch tubes and since a separate constant current source is provided for each pair of switch tubes, the total current flowing through each half of the push-pull windings is entirely dependent upon the combination of 1 or 0 voltage levels present at the digital input lines and is also dependent upon the setting of each of the constant current tubes.

The Y deflection circuits indicated by block 94 are identical in construction and operation to the X deflection circuits just described and it is deemed unnecessary to duplicate the details showing a description of those circuits which in operation are used to select the line in which information is to be displayed.

In view of the foregoing description of the X deflection circuits, it will be understood that the location of the beam on the tube face along the horizontal axis is controlled in accordance with the trigger stages of counter 50 (FIG. 3*b*) which are on. If all stages are off, the beam will be positioned at the extreme left margin and if all stages are on the beam was positioned at the extreme right margin. Various positions intermediate the left and right margins of the displayed lines are achieved by particular combinations of on triggers which cause conduction in the corresponding tubes **V1*b*–V256*b*** of FIG. 6.

With reference to FIGS. 3*a*, 3*b* and 6, when no correction signal is provided from Digital to Analog Voltage Converter 76 and Regulator Amplifier 77, the output voltage from Regulator 78 produces a steady predetermined voltage signal at input terminal 91. This signal voltage determines the total current through each of the tubes V1–V256 so that each tube may be considered as providing known increments of current for the "X" deflection winding. Tube V1 provides one increment of current while tube V2 provides two increments of current and so on. When, for example, the tubes **V2*a* through V256*a* and V1*b* are conducting, the cathode beam is deflected one incremental position to the right from the left display margin. Similarly, when tubes V4*a* through V256*a* and V1*b* and V2*b*** are conducting, the beam is displaced three increments from the left margin.

A correction signal from Converter 76 and Amplifier 77, however, raises the normal voltage signal from Regulator 78 at terminal 91 to increase the current a proportional amount through tubes V1–V256. This result causes a proportional current increase through the conducting ones of tubes **V1*a*–V256*a*, V1*b*–V256*b* and X deflection coils 83–86. Consequently, each increment of displacement of the beam is also increased in proportion to the correction signal generated by the Converter 76 in accordance with the count indicated by the Register 70. As an example, when the actual count in the Horizontal Position Counter 50 terminates at 448, stages T1–T32 thereof are off and each stage of the Correction Register 70 is set on to indicate a line expansion of 63 increments. Each increment of the 448 increment line must, therefore, be expanded approximately 14%. Digital to Analog Voltage Converter 76 and Amplifier 77 thus provide an output voltage signal to Regulator 78 to increase the current in tubes V1–V256** also 14%. In this manner, the current increments provided by the switch tubes to the X windings are equally increased so that a line of 448 normal line length increments is expanded to a line length equivalent to 512 normal or uncorrected increments.

It will be noted that any increase of current through tubes V1–V256 by a correction signal also produces a similar increase in any tubes **V1*a*–V256*a* that are conducting and in coils 83 and 84 when a push-pull type deflection winding is used. A center compensation circuit must be included to prevent displacement of the left margin home position of the beam. An example of a compensation circuit is shown in FIG. 6. This circuit comprises triode tubes 96 and 97 which operate to supply extra current to coils 85 and 86 of the X deflection winding when a correction voltage is encountered. The cathode of tube 96 is connected to a suitable supply potential similar to tubes V1–V256 and its control grid is connected to input terminal 91 which also controls the current through the latter tubes. The plate of tube 96 is connected to the cathode of tube 97. The control grid of tube 97 is connected to an adjustable bias potential and its plate is connected to coils 85 and 86 of the X deflection winding. The effect of these tubes is to supply extra current for coils 85 and 86 at any time a correction voltage is applied at terminal 91 and thereby counteract any beam displacement beyond the left margin occasioned by the increased current due to the correction signal. Extended beam displacement occurs only at the right margin of the tube face when this circuit is employed. Tubes 96 and 97 may be replaced with other suitable circuits, such as a difference amplifier, as desired to supply compensating current. A potentiometer 98** is provided to permit a centering adjustment of the beam on the tube face.

The description up to this point has considered the determination of character width and the production of a justification or correction signal to extend an information line to be displayed. The manner in which a line of information is displayed will now be described. Referring to FIGS. 3*a* and 3*b*, cathode ray tube 80 in this embodiment of the invention is shown as a well-known Compositron, manufactured by the Radio Corporation of America. The cathode ray tube 80 is of the image-forming type wherein a tungsten lamp 101 and condenser lens assembly 102 are used to illuminate an external matrix array 103 of characters which is shown in more detail in FIG. 7. The transparent characters of the opaque matrix are reduced by lens 104 and focused on the cathode ray tube photosensitive cathode 105 where the light images become current images. The electrons liberated from the cathode, when the matrix letter chart is projected on it, are accelerated to the plane of a selecting aperture 106. The aperture size is such that only one letter from the array can pass through it at a time. The magnetic deflection yoke coils 107 deflect the entire electron-image stream for the letter-by-letter selection. A single-letter portion of the electron stream emerging from the aperture enters the positioning and reproducing end of the tube. Here it passes through a metal cylinder 108, the potential of which is maintained a few volts negative with respect to the aperture in order to suppress secondary emission. The cylinder 108 is under control of an Unblank Control trigger 109 and an Unblank Amplifier 110 to selectively pass the letter beam on to the high potential region where the positioning deflection yokes focus and position the latter on the illuminized phosphorus screen 112. The reproduced letters may be displayed in lines and columns as desired. It is to be noted that this tube is merely one of other cathode ray tubes which may be used in conjunction with the invention.

It will be recalled that after all characters in a display line are presented during a justifying pass, the computer Justify trigger is turned off, the Horizontal Position Counter 50 is reset, and the display apparatus provides a Display Ready signal on line 21 to the computer Control Unit 17. In response to the latter signal the control unit again causes presentation of the characters serially on Character Bus 32 for display. When the coded data representing the first character appears on Bus 32, a Clock Start signal appears on line 22 to gate the coded data into Character Register 26 via AND circuits 24, and set Clock Go trigger 23 so that the signal on line 27 goes down. This action removes the reset condition on Clock 28 and permits Oscillator 29 and Clock Drive trigger 30 to operate. Since stage T1 of Clock 28 is on when reset, its signal in conjunction with the pulse from trigger 30 at AND circuit 45 on line 44 enables the output from Character Spaced Decoder 34 to set complement count trigger stages in Character Size counter 46. At this time, stage T2 of the clock turns on to permit the actual character width increments to be entered in Horizontal Position Counter 50. When a carry pulse occurs from counter 46, Character Display Gate trigger 54 is set on so that the inhibit condition of AND circuit 53 is removed permitting Clock 28 to advance to stages T3, T4 and T5. It will be noted that, on the display pass, Clock 28 and Character Display Gate trigger 54 are not reset at T4 time as during the justifying pass. Clock times T3–T5 are provided to permit settling of the horizontal X deflection coils which are supplied with current by the switch tubes in Horizontal Digital to Analog Current Converter 81 described above in conjunction with FIG. 6.

During the decoding of character input data and advance of Character Size Counter 46, the input data is also applied from line 33 along cable 114 to a suitable Digital to Analog Converter 115. Such converters are well known in the cathode ray tube art and need not be explained in detail. The parallel bit information on the cable is converted into a corresponding current signal which is applied to Selection Deflection Yoke 107 to direct the selected character-shaped beam through aperture 106 for display. The advance of Clock 28 through stages T3, T4 and T5 also permits the character selection current in yoke 107 to settle before the character is displayed.

Reference may be had to FIG. 7 for the arrangement of the characters on matrix 103. The corresponding bit codes are illustrated at the bottom and left side of the matrix. It will be seen, for example, that when the character "N" is to be displayed, a signal is present on the 1 4 and B character bit lines 33. Display, however, does not occur until cathode ray tube 80 is unblanked. Unblanking of the tube 80 occurs when stage T6 (FIG. 4*m*) of Clock 28 is turned on. A signal is produced on line 116 which sets the Unblanked trigger 109 on and provides an output signal from the binary 1 output to Unblank Amplifier 110 to remove the negative potential from suppression cylinder 108. The shaped beam of the selected character is now projected on the tube face. Tube 80 remains unblanked during the progression of Clock 28 through stages T6, T7 and T8.

Upon clock advance to stage T9, the display cycle for one character is ended. A signal from T9 appears on line 117 to OR circuit 63 to reset Character Gate Display trigger 54 off. The T9 pulse also appears on line 118 at AND circuit 120 where, in conjunction with a Clock Drive pulse on line 121, a signal is provided to OR circuit 65 to reset Clock Go trigger 23 off. This action produces an output signal on line 27 to stop Oscillator 29, reset Clock Drive trigger 30 to the off condition, and reset Clock 28 to stage T1. The T9 pulse also provides a signal on line 119 to OR circuit 58 to supply a Display Response signal to the computer on line 59 to Control Unit 17 signifying that the display apparatus is ready for coded input data representing the next character.

It will be recalled that when stage T2 of Clock 28 turned off, Horizontal Position Counter 50 had a count registered therein representing the width of the first character in line length increments. For example, if the first character was an "N," the count was eleven. Sufficient current was, therefore, supplied to coils 85 and 86 and removed from coils 83 and 84 (FIG. 6) to position the unblanked beam eleven increments toward the right from the left margin. Stages 1, 2 and 8 of Counter 40 were on which also turned on corresponding switch tubes V1*b*, V2*b* and V8*b* of the Horizontal Digital to Analog Circuit Converter 81. Tubes V1*a*, V2*a* and V8*a* were switched off so that the beam would appear eleven increments from the left margin.

When cathode ray tube 80 is unblanked at T6 clock time, the "N"-shaped beam would be normally projected with its center coinciding with the eleventh increment. However, when the character is displayed, it is to be centered at five and one-half increments from the left margin. Proper positioning is compensated for by properly displacing either matrix 103 or the character on the matrix the required amount. When the matrix is to be changed, it is preferably moved to the left one half the average incremental width of all characters thereon. Thus, if the average character width is twelve increments, the matrix is moved left to effect movement equivalent to six increments on the tube face. If the "N," therefore, requires eleven increments width, the matrix movement is too great and the "N" is positioned the equivalent of a one-half tube face increment to the right of its usual position on the matrix. This arrangement correctly centers the "N" when the tube is unblanked. On the character matrix illustrated in FIG. 7, it has been assumed that the entire matrix is to be displaced the equivalent of one half the average incremental width of all characters and only selected characters displaced relative to the matrix. For example, the "N" is illustrated as displaced one half unit to the right, the sixteen-increment "W" is displaced two units still further to the left because its half-width is eight increments, and the four-increment "I" is displaced four units to the right because its half-width is two increments. Other characters would also be appropriately located according to their respective widths. The individual characters may, of course, be displaced to the left their entire half-widths when the matrix is not moved. The amount of individual character displacement on the matrix required by either method depends upon the type font employed.

A succeeding character in a particular information line is presented for a display each time stage T9 (FIGS. 3*a* and 3*b*) is turned on. As each character is presented, its width is accumulated in Counter 50 so that the unblanked beam is moved from the last display position the necessary number of increments to the next position. The reset of Counter 50 occurs when the Justify signal appears on line 20 at OR circuit 74 to said single shot 75 in preparation for justification of a new line.

The invention may be easily modified to justify lines of other desired lengths. The modification is made by adding stages to Counter 50 and Converter 81 if longer lines are to be displayed. When shorter lines are required, the later binary stages are removed or disabled and corresponding current tubes rendered inoperative in Converter 81. It will also be noted that the maximum increments of line expansion may also be varied by altering the number of binary stages in Correction Register 70.

In view of the foregoing description, it can be seen that the invention provides line justification and proportional character spacing in a cathode ray tube display. Because of this ability, the display apparatus may be used for photocomposing without the necessity of providing an incrementing mechanism for photosensitive film on which the display is recorded. Furthermore, the display may be recorded at higher speeds since mechanical incrementing apparatus is not required. It can be seen that with the use of appropriate line placement controls through the use of a Vertical Position Register 130 (FIG. 3*b*) several lines of information may be displayed without the necessity of moving the recording medium for each line.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In a system for displaying on a cathode ray tube an information line composed of characters selected from a group with each character having a predetermined incremental width and said character plurality being represented by first and second identical sets of input data signals, display control apparatus comprising:

deflection means connected with said tube for advancing the cathode beam across the tube face by increments of predetermined size for a designated maximum number of increments;

means responsive to said first set of input data signals for increasing the size of said increments in proportion to the difference in number of increments required by said characters and said maximum number;

a character matrix having characters positioned therein as a function of their respective widths;

means responsive to said second set of input data signals for generating from said matrix selected characters for display on said tube face by said cathode beam; and control means responsive to said second set of input data signals for controlling said deflection means to advance said beam in accordance with the incremental width of each of said characters selected.

2. In a system for displaying on a cathode ray tube a plurality of characters selected from a group as an information line in which each character is of a predetermined incremental width and represented by first and second identical sets of input data signals, display control apparatus comprising:

deflection means for said tube for positioning the cathode beam thereof along said information line according to the magnitude of electrical signals applied thereto;

means connected to said deflection means operable for controlling the magnitude of said electrical signals for said deflection means;

decoding means responsive to said first and second sets of said input data signals for providing output pulses representing increments of line length allotted each of the characters in said line;

means responsive to said pulses resulting from said first sets of data pulses for determining the difference between said increments of length of said line and a designated maximum number of increments and providing a correction factor to increase the magnitude of said electrical signals as a function of said difference;

a character matrix having individual character occupying areas for the characters of said group with each character being located in a said area according to its incremental width;

means responsive to said second sets of input data signals for generating from said matrix selected ones of said characters for display on the tube face by said cathode beam; and means responsive to said pulses resulting from said second sets of data signals for operating said controlling means and said electrical signals of increased magnitude to position said selected characters on said tube face.

3. In a cathode ray tube system for displaying a plurality of characters selected from a group as a particular line of information on the tube face in which each of said characters is allotted predetermined increments of line length and is represented by coded input data signals, display control apparatus comprising:

means responsive to said input data signals for generating a selected character with an electron beam on said tube face, said generating means including a character matrix having individual character occupying areas therein with each character of said group offset from the center of its area an amount proportional to its width;

at least one deflection winding on said tube for positioning said character generating beam a predetermined number of increments of length along said information line according to the current supplied thereto;

current supply means connected to said winding and adapted to be controlled to supply designated increments of current to said winding;

decoding means responsive to said input data signals for providing output pulses representing increments of line length allotted said characters in said particular line;

counting means connected between said decoding means and said current supply means, having a predetermined count capacity equal to the maximum increments in an information line, and advanced by each of said output pulses for controlling said current supply means and indicating the total increments of line length required by said character plurality;

correction means connected to said counting means and said current supply means for increasing the current increments of the latter an amount proportional to the ratio of count difference between said capacity and total counts to said total counts; and means operable to render said generating means ineffective until said current increments have been increased.

4. In a cathode ray tube system for displaying a plurality of characters as a line of information on the tube face in which characters vary in width and are represented by coded input data signals, display control apparatus comprising:

a cathode ray tube having a photosensitive cathode and beam deflection windings;

character projection means including a matrix member having each of a group of characters arranged thereon and adapted to be projected onto said photosensitive cathode to provide a plurality of cathode beams each having a cross-section in the configuration of one of said characters, said characters being arranged on said matrix substantially on Cartesian coordinates with each being offset from one of said coordinates along said other coordinate an amount equal to the difference between its width and the average width of all said characters;

beam selection means adjacent said cathode operable to direct a selected one of said character beams toward said tube face;

a plurality of constant current devices each switchable to supply predetermined quantities of current to said windings to position said selected beam by predetermined increments along said line;

decoding means responsive to said input data signals to control said beam selection means and provide output pulses representative of the increments of line length required by each said plurality of characters;

counting means having a predetermined count capacity equal to the maximum increments of length in said information line adapted to be advanced by said output pulses to indicate the total increments in said infromation line;

means for converting said count difference between said capacity and total counts into a correction signal varying in magnitude according to the ratio of said difference count and said total count;

means for applying said correction signal to said constant current devices to increase the respective quantities of current therethrough and increase the size of each increment of said advance;

means connected to said decoding means for switching selected ones of said constant current devices in accordance with the increments of line length required by said selected character; and interlock means disabling said beam selection means until said correction signal has been applied to said constant current devices and disabling said conversion means thereafter during said line display.

5. In a cathode ray tube system for displaying across the tube face a line of characters each represented by input data and having characteristic widths, justifying apparatus comprising:

means including counting means connected to said tube for deflecting the cathode beam across said tube face by standard increments up to a maximum number of increments;

means responsive to said input data representing said characters appearing in said line for determining the difference between the number of increments required by said characters and said maximum increments; and means connected to said deflection means for increasing the size of said standard increments in proportion to said difference.

6. In a cathode ray tube system for displaying across the tube face a line of characters each represented by input data and having characteristic widths, justifying apparatus comprising:

means including counting means connected to said tube for deflecting the cathode beam across said tube face by standard increments up to a maximum number of increments;

means responsive to said input data representing said characters appearing in said line for determining the difference between the number of increments required by said characters and said maximum increments;

means connected to said deflection means for increasing the size of said standard increments in proportion to said difference; and means for displaying said characters on said tube face with said beam at positions determined in accordance with said increments of increased size.

7. In a system having a cathode ray tube for display across the tube face a line of characters each represented by first and second identical sets of input data signals and having predetermined incremental widths, justifying apparatus comprising:

deflection means including counting means connected to said tube for advancing the cathode beam across the tube face by increments of standard size for a designated maximum number of increments;

means responsive to said first set of input data signals for determining the difference between the number of increments required by said characters and said maximum number of increments;

means connected to said deflection means for increasing the size of said standard increments in proportion to said difference;

means responsive to said second set of said input data signals for generating with said cathode beam selected characters for display from said tube face; and means responsive to said second set of input data signals for controlling said deflection means to advance said beam in accordance with the incremental width of each of said characters selected and by said increments of increased size.

8. In a cathode ray tube device for displaying on the tube face a line of characters each represented by coded input data and having a width of a predetermined number of increments of line length, justifying apparatus comprising:

a deflection winding for said tube;

a plurality of constant current devices each controllable to supply predetermined increments of current to said winding to position said beam incrementally across said tube face;

decoding means responsive to said input data for providing output signals each indicative of an incremental width allotted each said character in said linear display;

counting means having a predetermined count capacity representative of the maximum increments in a line, advanced by said output pulses to determine the total increments of width in said line;

means for converting the difference between said count capacity and the actual count therein into a correction signal; and means for applying said correction signal to said constant current devices to increase the size of said current increments.

9. In a cathode ray tube system for displaying pluralities of characters as lines of information across the tube face with each character represented by coded input information and having predetermined incremental width, justifying apparatus comprising:

deflection means on said tube for advancing the cathode beam in a path across the tube face in response to the quantity of current therethrough;

a plurality of constant current means each providing predetermined current quantities and being selectively switchable to supply current to said deflection means in accordance with the location of a character to be displayed along said path;

means for decoding said input data for each of the characters in a line and providing output pulses representing the increments of line length each of said characters requires;

counting means having a fixed count capacity equal to the maximum increments in a line, adapted to be advanced by said output pulses and indicate the total increments in said character line;

means for converting the difference between said maximum and total counts into a correction signal having an amplitude proportional to the ratio of said count difference to said actual count; and means for applying said correction signal to said constant current means to thereby increase the current therethrough by an amount equal to said ratio.

10. In a cathode ray tube system for displaying as an information line a plurality of characters selected from a group in which each character has a predetermined width and is represented by distinctive input data signals, apparatus for spacing adjacent characters in proportion to their widths comprising:

a character matrix having individual character occupying areas with each area having a character located therein as a function of its width;

means responsive to said input data signals for generating a selected one of said characters by a cathode beam for display on the face of said tube;

deflection means for advancing said cathode ray incrementally across the face of said tube; and means responsive to said input data for controlling the advance of said beam in accordance with the width of said selected character.

11. In a cathode ray tube system for display as an information line a plurality of characters selected from a group in which each character has a predetermined width and is represented by distinctive input data signals, apparatus for spacing adjacent characters in proportion to their widths comprising:

a character matrix having individual character occupying areas with each area having a character located therein as a function of its width;

means responsive to said input data signals for generating a selected one of said characters by a cathode beam for display on the face of said tube;

deflection means for advancing said cathode ray incrementally across the face of said tube;

decoding means responsive to said data signals for providing output pulses each representative of an increment of length of said line; and control means responsive to said output pulses for advancing said beam in accordance therewith.

12. In a cathode ray tube system for linearly displaying informational characters on the tube face in response to coded input data signals for each character, apparatus for spacing adjacent characters in proportion to their widths comprising:

cathode ray tube means having a photosensitive cathode for producing cathode beams with a cross-section in the configuration of illuminated areas thereon;

a matrix of characters adapted to be optically projected on said cathode, as illuminated areas, said characters being arranged on said matrix substantially along Cartesian coordinates with each said character being offset from one of said coordinates in a direction and by an amount which is a function of its width;

selection means connected with said tube responsive to control signals for selecting a cathode beam of one of said character images on said cathode for projection toward said tube face;

decoding means responsive to said input data signals for supplying control signals to said selection means to select a cathode beam of one of said characters;

beam positioning means operable to locate said selected beam on said tube face; and means responsive to said input data signals of each said character for operating said beam positioning means in acccordance with the width of said character.

References Cited by the Examiner

UNITED STATES PATENTS 3,067,660 12/1962 Gardberg ------------- 95—4

NEIL C. READ, *Primary Examiner.*

A. J. KASPER, *Assistant Examiner.*